United States Patent [19]

Fariss

[11] Patent Number: 4,818,491
[45] Date of Patent: Apr. 4, 1989

[54] SUNTANNING GAUGE

[75] Inventor: James D. Fariss, Media, Pa.

[73] Assignee: Sun du Jour, Inc., Newark, Del.

[21] Appl. No.: 167,522

[22] Filed: Mar. 14, 1988

[51] Int. Cl.$^4$ ............... G01K 11/12; G01N 21/78
[52] U.S. Cl. .................................. 422/56; 116/207; 250/372; 250/461.1; 350/1.1; 374/161
[58] Field of Search ............... 374/161, 162; 250/372; 350/1.2, 1.1; 422/56

[56] References Cited

U.S. PATENT DOCUMENTS

| | | | |
|---|---|---|---|
| 2,064,475 | 12/1936 | Ives | 350/1.2 X |
| 2,392,979 | 1/1946 | Douden | 250/467.1 |
| 3,967,124 | 6/1976 | Strutz | 250/372 |
| 4,198,861 | 4/1980 | Luk | 374/162 |
| 4,657,736 | 4/1987 | Marsoner et al. | 422/56 |
| 4,717,545 | 1/1988 | Morris | 422/56 |
| 4,749,865 | 6/1988 | Scheller | 250/372 X |
| 4,752,447 | 6/1988 | Kimmel et al. | 422/56 |

OTHER PUBLICATIONS

"Ultraviolet Absorption of Styrene–Butadiene Latex On Pigment–Coated Paper", by H. Fujiwara et al., 12/1987, Tappi Journal, pp. 97–100.

Primary Examiner—Daniel M. Yasich
Attorney, Agent, or Firm—Mortenson & Uebler

[57] ABSTRACT

A suntanning gauge is provided having a plurality of UV-light absorbing lenses of varying thicknesses affixed to a convenient-to-carry base. Under each lens is a fluorescent material which emits visible light when UV-light impinges upon it. The fluorescent material preferably is placed over a black background under each lens. Associated with each lens are indicia corresponding to the degree of strength of sunscreening compositions, the thinnest lens, for example, having the number 4 near it corresponding to a sun protective factor of 4, and the thickest lens having the number 30 near it corresponding to a sun protective factor of 30, and any desired combinations in between. On any given day, depending on the intensity of the sun, UV-light will penetrate none, one or more of the lenses, and, if a lens is penetrated, the flourescent material under it will glow. The highest indicia near a glowing lens will indicate what degree sun protective factor lotion to apply to avoid skin damage. In an alternate embodiment, a gauge is provided for determining when sunscreen lotion has worn off the user's body and should be reapplied.

10 Claims, 2 Drawing Sheets

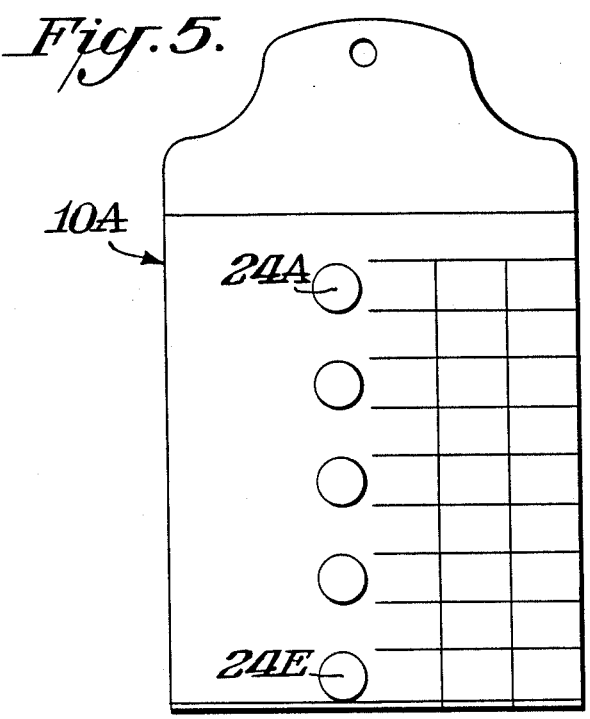

SUNTANNING GAUGE

BACKGROUND OF THE INVENTION

This invention relates to a gauge which can be used to determine the proper sunscreen lotion to apply to one's skin on any given day to prevent harmful UV radiation from reaching the skin. Alternately, a gauge is disclosed which will signal the user that applied sunscreen lotion is depleted, either through evaporation, bathing, etc., to the extent that it no longer provides protection and more lotion should be applied.

Exposure to sunlight and its UV-B component can result in four distinct skin damage conditions: sunburn; pigmentary and texture changes in the skin; actinic damage or sking aging; and development of non-melanoma skin cancer and malignant melanoma skin cancer.

The relationship between UV exposure and the cause and risk of these skin damage conditions has been quantified (Fears TR, Scotto J: Estimating increases in skin cancer morbidity due to increases in ultraviolet radiation exposure. *Cancer Invest*, 1983; 1:119-126).

Other studies have classified the UV-B spectrum (frequencies from 290 nanometers to 330 nanometers) as the prime cause of sunburn (Nachtwey DS, Rundel RD: A photobiological evaluation of tanning booths. *Science*, 1981; 211:405-407). Because UV-B is a mutagen (Suzuki F, Han A, Lankas GR, et al: Spectral dependencies of killing, mutation, and transformation in mammalian cells and their relevance to hazards caused by solar ultraviolet radiation. *Cancer Research*, 1982; 41:4916-4924 and Doniger J, Jacobsen ED, Krell K, et al: Ultraviolet light action spectra for neoplastic transformation and lethality of Syrian hamster embryo cells correlate with spectra for pyrimidine dimer formation in cellular DNA. *Proc National Academy of Science USA*, 1981; 78:2378-2382), the risk of nonmelanoma skin cancer and malignant melanoma is a cumulative and long lasting medical danger to a large number of the World's population (Robert S. Stern, M.D., Milton C. Weinstein, Ph.D., Stuart G. Baker, ScD: Risk reduction for nonmelanoma skin cancer with childhood sunscreen use, *Arch Dermatol*, 1986; 122:537-545).

A variety of colorless sunscreen lotions that can block most UV-B from penetrating the epidermis layer of the skin and prevent these dangerous medical conditions have been developed and are marketed commercially. The effectiveness of these sunscreens in reducing sunburn in humans is well established (Cripps DJ, Hegedus S: Protection factor of sunscreens to monochromatic radiation, Arch Dermatol, 1974; 109:202-204).

A grading system called the "sun protective factor" (SPF) is used to quantify the degree of protection afforded by a given sunscreen lotion (Pathak MA: Sunscreens: Topical and systemic approaches for protection of human skin against harmful effects of solar radiation, *Journal of American Acad Dermatol*, 1982; 7:285-312).

The SPF number is the ratio of the dose of UV radiation required to produce minimal pinkness 24 hours after exposure on skin covered by the sunscreen, to the dose of UV radiation required to produce similar pinkness on unprotected skin.

Many sunscreens with SPF values from 2 through 30 are currently available with very little, if any, instructions as to which SPF number to use, when to use it, or when to reapply it.

While SPF numbers are determined in the laboratory, the actual protection factors a given agent provides in daily use varies with the user's complexion, frequency and thickness of application, perspiration and exposure to water. Hence, protection is at best a hit or miss gamble.

As the dangers of UV radiation exposure increase with the depletion of the Ozone layer (Ted Koppel, Michael Oppenheimer, Ph.D., Kevin Fay, Irving Mintzer, et al: ABC News NIGHTLINE, Aug. 26, 1987 show No. 1632, 7 West 66th Street, New York, NY 10023) and the ever-increasing need to be a sunseeking society (Robert S. Stern, M.D., Milton C. Weinstein, Ph.D., Stuart G. Baker, ScD: *Arch Dermatol*, 1986; 122:537-545), there is no inexpensive, readily available device that can both warn of danger and indicate what precautions to take. Aside from becomming a sun-avoidance society, the only choices are to take the gamble or stay indoors to avoid the sun altogether.

SUMMARY OF THE INVENTION

A suntanning gauge is provided comprising a plurality of UV-light absorbing lenses of varying thicknesses affixed to a base, under each lens is provided a fluorescent material which emits visible light when UV-light impinges upon it, the base having indicia thereon near the lenses, the indicia corresponding to the sun protective factor number provided by sunscreening compositions, the thinnest lens having the lowest sun protective factor number placed near it and the thickest lens having the highest sun protective factor number placed near it. A black background preferably is provided under the fluorescent material. The base preferably has three indicia thereon near each lens, the three indicia for each lens corresponding to the sun protective factor number provided by sunscreening compositions applied to fair, medium and dark complexioned people. The gauge preferably has five lenses located in a linear array affixed to a base which is approximately the size of a conventional credit card.

Also provided is a gauge for determining the presence/absence of sunscreen lotion comprising an adhesive base layer to which is affixed a porous layer saturated with a pH-indicating litmus solution, the top of the porous layer having a film coating layer, the film coating layer being of a material which degrades upon exposure to UV-light into at least one acidic or basic degradation product, whereby when the proper sunscreen lotion which provides protection at the time of use is present on top of the film, no UV-light passes through to the film and the color of the litmus solution is unaffected and, when the lotion is depleted to the extent that it no longer provides protection, UV-light passes through to the film causing it to degrade into at least one degradation product which causes the litmus solution to change color, thereby warning the user to reapply lotion. The film coating layer preferably is polyvinylchloride, and the at least one degradation product is then hydrochloric acid. The porous layer preferably is paper. The suntanning gauge and the gauge for determining the presence or absence of sunscreen lotion may be used separately or in combination.

BRIEF DESCRIPTION OF THE DRAWINGS

FIG. 1 is a front elevational view of the gauge for determining the proper sunscreen lotion to apply in combination with a gauge which signals the user that applied sunscreen lotion is depleted, all according to the invention.

FIG. 2 is a side elevation, partly in cross-section of the gauge shown in FIG. 1.

FIG. 3 is an end elevational view of the gauge shown in FIG. 1.

FIG. 4 is a cross sectional view taken along line 4—4 of FIG. 1.

FIG. 5 is a schematic front elevational view of only the gauge for determining the proper sunscreen lotion to apply.

Figure 6:
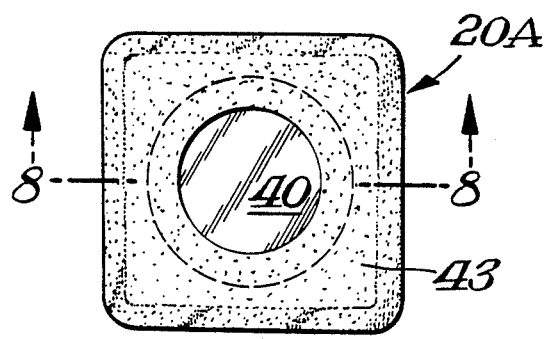
FIG. 6 is a top plan view of an alternate embodiment of the gauge which signals the user that applied sunscreen lotion is depleted, in the form of an adhesive bandage.

DETAILED DESCRIPTION OF THE INVENTION AND PREFERRED EMBODIMENTS WITH REFERENCE TO THE DRAWINGS

A suntanning gauge is provided having a plurality of UV-light absorbing lenses of varying thicknesses affixed to a convenient-to-carry base. Under each lens is a fluorescent material which emits visible light when UV-light impinges upon it. The fluorescent material preferably is placed over a black background under each lens. Associated with each lens are indicia corresponding to the degree of strength of sunscreening compositions, the thinnest lens, for example, having the number 4 near it corresponding to a sun protective factor of 4, and the thickest lens having the number 30 near it corresponding to a sun protective factor of 30, and any desired combinations in between.

On any given day, depending on the intensity of the sun, UV-light will penetrate none, one or more of the lenses, and, if a lens is penetrated, the fluorescent material under it will glow. The highest indicia near a glowing lens will indicate what degree sun protective factor lotion to apply to avoid skin damage. Indicia are preferably provided for fair, medium and dark complexioned people.

In an alternate embodiment, a gauge is provided for determining when sunscreen lotion has worn off the user's body and should be reapplied. The device comprises an adhesive base to which is affixed a thin porous layer saturated with a pH-indicating litmus solution and on top of which is coated a polyvinylchloride (PVC) film. This device can be used with the suntanning gauge described above or it can be used separately. If sunscreen lotion is applied to the top surface of the PVC film, as long as no UV-light passes through it, nothing happens. As the lotion wears off by evaporation or bathing, UV-light begins to penetrate the PVC film causing it to degrade and give off hydrochloric acid which changes the color of the litmus solution. Then it is time to reapply the sunscreen lotion.

A detailed description of the invention and preferred embodiments is best provided with reference to the accompanying drawings wherein FIG. 1 is a front elevational view of the gauge 10 for determining the proper sunscreen lotion to apply in combination with a gauge 20 which signals the user that applied sunscreen lotion is depleted. The device preferably is of credit card size, is made of plastic, and has indicia 12, 32 indicating the time and type of day. A plurality of UV-light absorbing lenses 24 are affixed to the device as shown. Five lenses 24A through 24E are shown, but more or less than five may be utilized. The lenses 24A–24E, which may be made of UV-light absorbing clear Plexiglas ®, type V(811)-100uvr3, made by the Rohm and Hass Co., have indicia 18, 34 associated with each corresponding to the various sun protective factor (SPF) ratings for sunscreen lotion. These lenses also preferably have indicia 14 associated with each corresponding to various skin complexions such as fair (F), medium (M) and dark (D) as shown. Thus, for lens 24A, generally for early a.m. or late p.m., if it is illuminated and lenses 24B–24E are not illuminated, then if the user is fair complected, he should apply lotion having SPF of 4. For medium to dark complected people in this situation, no lotion need be applied yet. Proceeding downwardly from lens 24A to 24E, each successive lens is somewhat thicker than the preceeding lens. Thus, at any given time of day, lens 24B will absorb more UV-light (conversely, allow less light to pass through) than lens 24A, and so on to lens 24E. Preferred thicknesses of lenses 24A–24E are 20, 36, 52, 68 and 84 mils, respectively. Proceeding downwardly toward lens 24E, the indicia 18, 34 corresponding to various SPF numbers for the various lotions, and associated with each lens, increase. Thus, for a bright sunny day at the seashore, all lenses 24A–24E would be illuminated and the gauge of the invention would tell a fair-skinned user to apply lotion having a SPF of 30. Opening 26 is provided for attaching to a chain.

As shown in FIG. 1, in combination with gauge 10 is a button-shaped gauge 20 mounted on a slide mechanism 16 which slides in and out of the bottom portion of gauge 10 as indicated by the double-headed arrow 28. Gauge 20, to be described more fully below, is such that its color changes after only a few minutes of UV-light absorption. Thus, if the desired sunscreen lotion is applied as a thin film on top of translucent lens 22, and slide 16 with button gauge 20 is pushed in, so long as the lotion is effective and no UV-light penetrates lens 22, nothing happens. However, as the lotion layer on top of lens 22 is depleted, UV-light then penetrates to button gauge 20 and, within minutes, its color changes altering the user to apply more lotion. Once this occurs, reference again may be had to gauge 10 to determine which SPF factor lotion to apply at that time of day, and more lotion should be applied.

FIG. 2 is a side elevation, partly in cross-section, of the suntanning gauge shown in FIG. 1. Gauge 10 is shown having lenses 24A–24E affixed to it. Under each lens is a fluorescent material 30, as seen in the partial cross-sectional view under lens 24B. This material emits visible light when UV-light impinges upon it. One such material is marketed under the product designation U.V. Tracer, Lime Green, #T-704-13, made by Shannon Luminous Material Co. The use of this material placed against a black background 36 causes the viewer to see a black lens until UV excitation of the fluorescent material causes it to glow a lime green color, thereby visually turning off the black background as it glows a bright greenish-yellow color. Button gauge 20, mounted on slide 16, slides into the unit in grooves 17. Textured lens 22 of the device can be wiped with a currently-used sunscreen lotion leaving a thin film of the sunscreen on the top of the UV indicating disc 20. This disc is pushed in and is shielded from the UV rays of the sun under the sunscreen that has been applied to the textured area 22 and to the user's body. The protective layer of sunscreen lotion is consumed by the elements, both on the device and the body, until both gauge 20 and the body begin to receive harmful UV radiation levels. It has been noted that (NIGHTLINE, supra), after only 20 minutes of unprotected exposure to UV-B radiation, damage begins to occur to the skin. By monitoring the color change of the disc, one can determine when it is time to reapply, either with the same sunscreen lotion or to select, using gauge 10, a different sunscreen lotion for less or more protection.

FIG. 3 shows gauges 10 and 20 in bottom end elevation, including UV-absorbing lens 24E, textured lens 22, button gauge 20 mounted on slide 16 having protrusions 15 to enable the user to easily slide the gauge under lens 22 in grooves 17.

As shown in FIG. 4, button gauge 20 preferably comprises a ¼ inch paper dot 38 made from a self-sticking label such as are used in computer labeling systems, or Avery self-sticking labels. They are white rag paper treated with a pH-indicating solution 44, which can be #160-500, 4.0 to 10.0 pH litmus solution made by the Fisher Co. The paper is saturated with the indicator solution and allowed to dry. It is then coated with PVC film 40 by coating P.V.C. liquid green, series 65 #00065865, made by Essex Specialty Products, Inc., to a thickness of about 1 mil and allowed to dry. Green is preferred because of its extreme color change capabilities. When this is exposed to the sun, without applying sunscreen lotion, as the UV spectrum of sunlight begins to degrade the PVC film, hydrochloric acid is given off. The indicator solution, which determines hydrogen ion concentration, begins to change color. The color changes first to a deep brown, then to a bright lavender. These two color changes, taking approximately 8 to 10 minutes and 18 to 20 minutes, respectively, create a two-color warning system before skin damage occurs. When lotion is applied over button gauge 20 to block this UV penetration, nothing happens as long as the lotion is effective in keeping the UV-light from penetrating to the PVC film. As lotion is depleted, the UV radiation penetrates to the PVC film, it degrades to HCl and the color of the litmus saturated paper changes, thereby alerting the user to apply more lotion as discussed above.

FIG. 5 is a schematic front elevational view of gauge 10A, which is a gauge for determining the proper sunscreen lotion to apply and is similar in all respects to gauge 10, but gauge 10A is not used in combination with button gauge 20.

Figure 7:
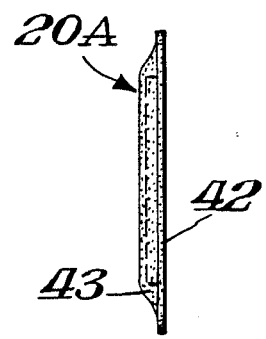
FIG. 7 is a side elevational view of the gauge of FIG. 6.
Figure 8:
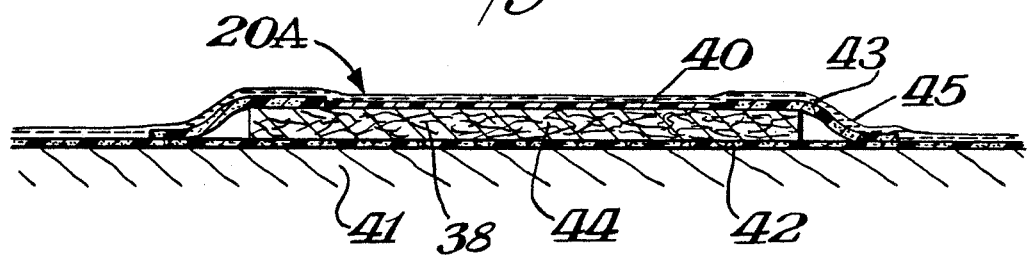
FIG. 8 is a cross-sectional view taken along line 8—8 of FIG. 6.

FIGS. 6–8 show an alternate embodiment 20A of button gauge 20 in the form of an adhesive bandage to be applied directly to the skin of the user. In the top plan view of FIG. 6, gauge 20A is shown encased in adhesive film 43. The PVC film 40, exposed through the opening as shown, is affixed to the user's skin by adhesive-backed film 42, and a desired lotion is applied over the skin and, in the same manner and quantity, over gauge 20A.

FIG. 7 shows a side elevation of gauge 20A and adhesive films 42 and 43.

FIG. 8, in cross-section, shows gauge 20A comprising paper layer 38 backed with adhesive film 42 applied to skin surface 41. The paper layer 38 contains litmus solution 44 and is covered by PVC layer 40, and held in place by adhesive-backed film 43. Sunscreen lotion layer 45 is applied over the surface of skin 41 and gauge 20A. While the lotion is effective, nothing happens. When lotion is depleted and UV rays penetrate through the lotion layer, the litmus solution changes color.

This embodiment is particularly preferred because it can be applied directly to the body of the user, lotion can be applied to both body and gauge in exactly the same manner, and both gauge and body experience the same lotion-depleting effects from evaporation, bathing, etc. The device is especially suited for monitoring the suntanning of young children and preventing excessive burning.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A suntanning gauge comprising a plurality of UV-light absorbing lenses of varying thicknesses affixed to a base, under each lens is provided a fluorescent material which emits visible light when UV-light impinges upon it, said base having indicia thereon near said lenses, said indicia corresponding to the sun protective factor number for various skin complexions as provided by sunscreening compositions, the thinnest lens having the lowest sun protective factor number placed near it and the thickest lens having the highest sun protective factor number placed near it.

2. The gauge of claim 1 wherein a black background is provided under said fluorescent material.

3. The gauge of claim 1 wherein said base has three indicia thereon near each said lens, the three indicia for each lens corresponding to the sun protective factor number provided by sunscreening compositions applied to fair, medium and dark complexioned people.

4. The gauge of claim 1 having five said lenses located in a linear array affixed to the base which is approximately the size of a conventional credit card.

5. The suntanning gauge of claim 1 having affixed thereto a gauge for determining the presence/absence of sunscreen lotion comprising an adhesive base layer to which is affixed a porous layer saturated with a pH-indicating litmus solution, the top of said porous layer having a film coating layer, said film coating layer being of a material which degrades upon exposure to UV-light into at least one acidic or basic degradation product.

6. The suntanning gauge of claim 5 wherein said film coating layer is polyvinylchloride, and the at least one degradation product is hydrochloric acid.

7. A gauge for determining the presence/absence of sunscreen lotion comprising an adhesive base layer to which is affixed a porous layer saturated with a pH-indicating litmus solution, the top of said porous layer having a film coating layer, said film coating layer being of a material which degrades upon exposure to UV-light into at least one acidic or basic degradation product, whereby when the proper sunscreen lotion, which provides protection at the time of use, is present on top of said film, substantially no UV-light passes through to said film and the color of said litmus solution is unaffected and, when said lotion is depleted to the extent that it no longer provides protection, UV-light passes through to said film causing said film coating layer to degrade, one degradation product being hydrochloric acid which causes said litmus solution to change color, thereby warning the user to reapply lotion.

8. The gauge of claim 7 wherein said film coating layer is polyvinlychloride.

9. The gauge of claim 7 wherein said porous layer is paper.

10. The gauge of claim 7 to adhesive based bandage means to enable a user to attach said gauge to the user's skin.

* * * * *

UNITED STATES PATENT AND TRADEMARK OFFICE
CERTIFICATE OF CORRECTION

PATENT NO. : 4,818,491

DATED : April 4, 1989

INVENTOR(S) : James D. Fariss

It is certified that error appears in the above-identified patent and that said Letters Patent is hereby corrected as shown below:

In the Abstract, line 16, please change "flourescent" to --fluorescent--.

In col. 4, line 45, please change "altering" to --alerting--.

In col. 5, line 44, please change "HC1" to --HCl--.

Signed and Sealed this

Tenth Day of October, 1989

Attest:

DONALD J. QUIGG

Attesting Officer

Commissioner of Patents and Trademarks